UNITED STATES PATENT OFFICE.

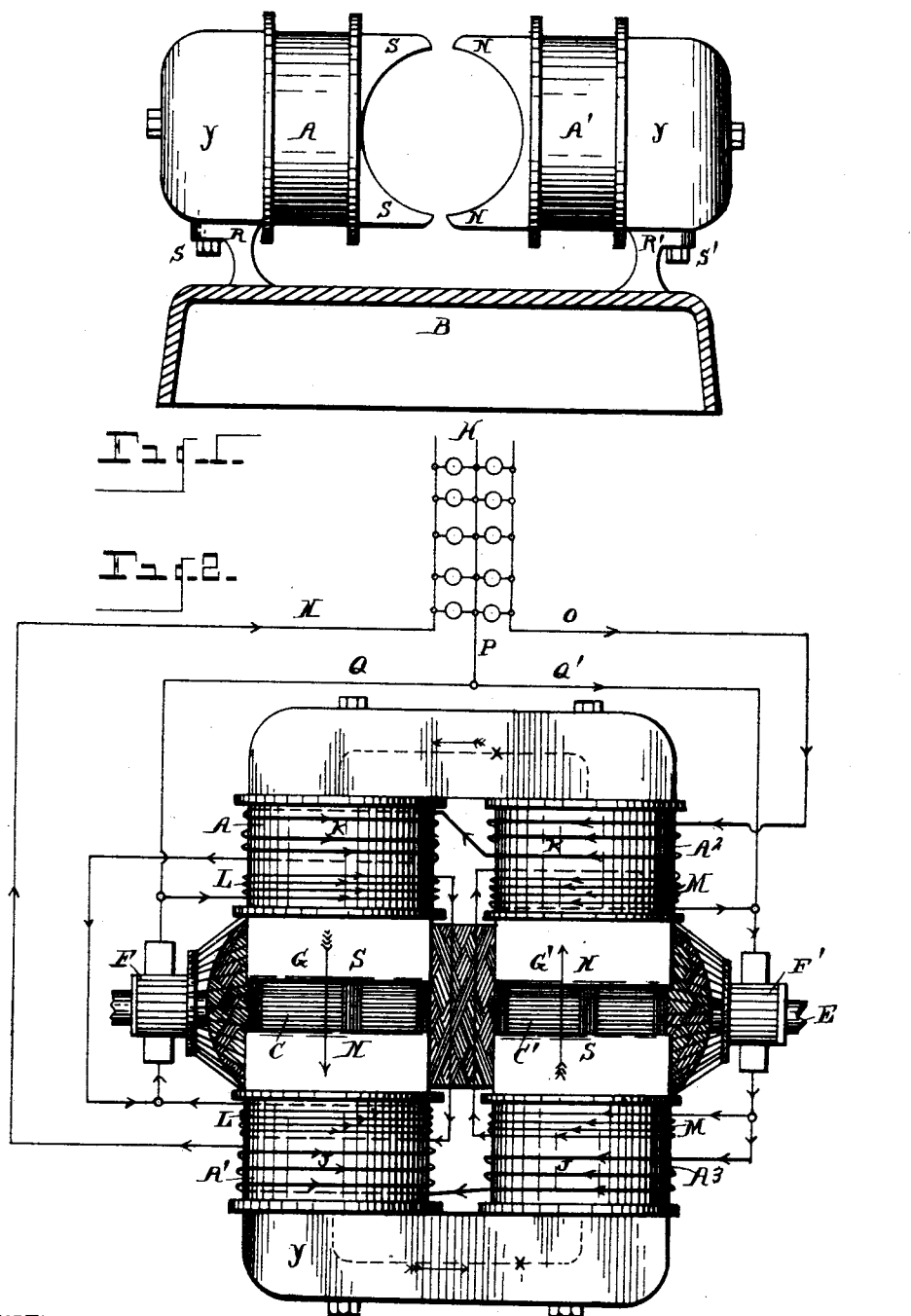

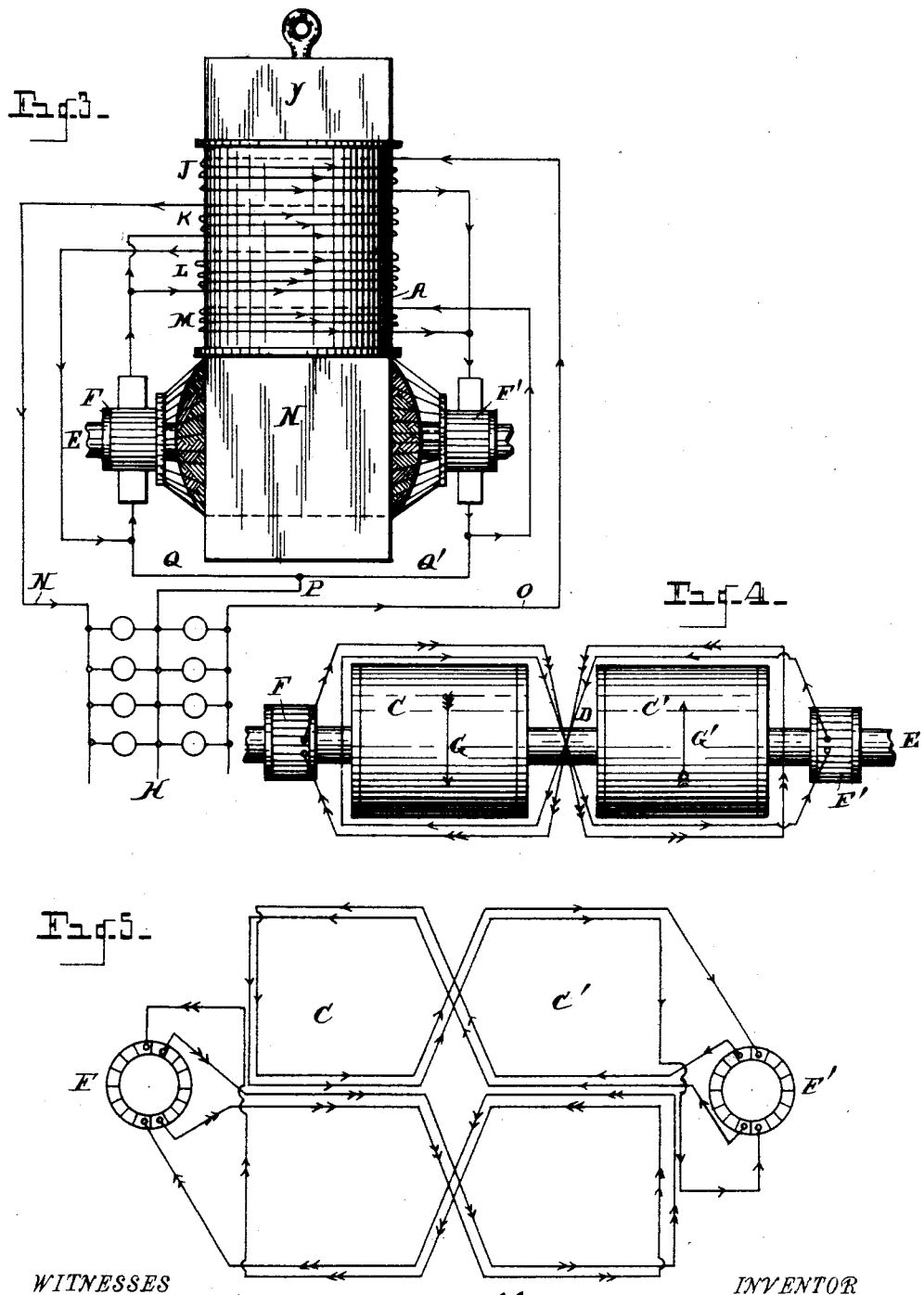

THOMAS H. HICKS, OF DETROIT, MICHIGAN.

DYNAMO-ELECTRIC MACHINE.

SPECIFICATION forming part of Letters Patent No. 541,854, dated July 2, 1895.

Application filed August 29, 1894. Serial No. 521,614. (No model.)

*To all whom it may concern:*

Be it known that I, THOMAS H. HICKS, a subject of the Queen of Great Britain, residing at Detroit, county of Wayne, State of Michigan, have invented a certain new and useful Improvement in Double-Armature-Circuit Three-Wire-System Electric Machines; and I declare the following to be a full, clear, and exact description of the invention, such as will enable others skilled in the art to which it appertains to make and use the same, reference being had to the accompanying drawings, which form a part of this specification.

This invention relates to new and useful improvements in a double-armature-circuit, three-wire system, electric machine, and is intended for application to electric-generators and motors.

My scheme embraces features which are capable of application to machines having either one or two magnetic fields of force.

One feature of my present invention refers to the manner of winding the field-magnets of a machine having two armature circuits and two commutators mounted upon one shaft. A second feature refers to the manner of connecting the field-magnet coils with the two armature circuits and a "three-wire" work-circuit, and a third feature refers to the manner of applying said field-magnet windings to a machine having double magnetic fields of force.

The specific object of my invention is to produce a self-exciting and self-regulating machine that will be capable of operating a three-wire work-circuit, and at the same time have the two armature circuits capable of independent effective action in case one of them should become burned out, or otherwise rendered useless.

I mean by the term, "three-wire system," that system commonly known as the "Edison three-wire system," where the translating devices are arranged in the work-circuit in multiple series, using three main line leads from the generators, one of them being known as the "neutral" or "compensating" wire. I show such a work-circuit in Figures 2 and 3 of the drawings; but, of course, I lay no claim to the "three-wire" system when considered by itself.

In the accompanying drawings, which fully illustrate my invention, Fig. 1 is an end elevation of the device embodied in Fig. 2, simply showing the iron parts of field-magnets, yokes, and base, the windings and armature being omitted. Fig. 2 is a plan view showing all the features of my invention as applied to a machine having double fields of force. Fig. 3 is a side elevation showing a modification in which only one field of force is used. Fig. 4 is a longitudinal diagram view of the armature seen in Fig. 2. Fig. 5 is a diagram view showing more fully the method of winding the two circuits of the armature shown in said Fig. 2.

I do not claim anything new in the internal construction of the armature. I have simply shown the windings and cores in detail so as to contribute to a better understanding of the construction I show in Fig. 2.

The various parts of the machine are indicated in the drawings as follows:

B is an iron base having field-magnet yoke $y$, $y$ secured thereto by bolts $s$, $s$, and supports R, R'.

A, A', $A^2$, $A^3$, are field-magnet cores having pole-pieces N. S. N. S. The field-magnets of each machine are wound with four sets of coils; the coils L, M, forming two sets of shunt coils for primarily exciting the magnets, and the coils J, K, forming two sets of series or supplemental coils for effecting regulation of the machine. Eight distinct coils are shown in Fig. 2, but they are all connected so as to form only four sets, the same as shown in Fig. 3. The arrangement of these coils upon the field magnets, will depend upon whether one or two fields of force are used for the armature circuits; Fig. 2 showing two fields of force and Fig. 3 only one field of force.

E is a shaft.

F and F' are commutators.

C and C' are armature cores separated by a space D when the conductors are wound thereupon, as shown in Figs. 4 and 5, Fig. 5 being a diagram of two such sets of coils as are shown in Fig. 4. The long arrows in Figs. 2 and 4 indicate the relative directions of the magnet lines of force which flow through the cores C and C' of the armature. Therefore, the armature conductors require to cross through the space D between the two cores, when used in machines having two fields of force, as shown in Fig. 2; but I would have it understood, however, that either two drum or two Gramme armatures could be used instead of the one I show in Figs. 2, 4 and 5. So long as either two armatures or two windings are mounted upon the same shaft the same object can be accomplished.

H is a three-wire work-circuit, showing the translating devices arranged therein in multiple-series with each other, in the usual manner.

The field-coils are connected in the following manner: The field-magnet windings, as before stated, consist of four circuits composed of bobbins J, K, L and M. Bobbins L are connected in shunt with the brushes of the commutator F; bobbins M, with the brushes of the commutator F', and the bobbins J and K—which are supplemental coils—are arranged in linear series with the work-circuits. The direction of the flow of current through all of said bobbins is indicated by arrow heads on the coils and conductors leading to and from the same.

The coils L and M are exciting coils, and are not joined in linear series with each other and the two armature windings; but coils L are supplied with current from the armature windings which terminate in the commutator F, and coils M from the armature windings which terminate in the commutator F'. This I do so as to be able to operate the dynamo in case one of the armature circuits should burn out, for, in such a case, all I would require to do would be to join L and M in multiple arc with the uninjured armature circuit, and the dynamo could then be operated, giving out one-half of its out-put capacity. This latter feature forms an important part of my scheme.

The series coils J and K, it will be observed, are both wound upon field magnet cores which convey lines of force to two armature windings situated upon the same armature core. In this respect, machines constructed in accordance with types illustrated by Figs. 2 and 3, will operate alike. In this way I can combine two dynamos in one, and still obtain as good results as are capable of being obtained from two separate machines.

Machines constructed in accordance with my invention operate a "three-wire" system as follows: The exciting coils L and M are supplied with current from the two armature windings. Therefore the two armature circuits combine to maintain the field of force in a manner similar to separately excited machines; both coils M and L acting upon magnets common to the two armature windings.

The series coils, J and K, are arranged in linear series with the work-circuit H; J being connected to the work-circuit by the conductor marked N, and coils K being connected to the work-circuit by the conductor marked O. When the two series coils J and K are both effective, then the work-circuit is supplied with an electric pressure resulting from the two armature circuits combined; but when current flows through only one of the series coils J or K, then the work-circuit is supplied with current having the pressure of only one armature circuit; but the voltage of the armature circuit, not supplying the work-circuit, will naturally rise when its load is turned off. Consequently it will supply more current to its exciting coils, which will thereby increase the field of force for the other armature circuit which is supplying the work-circuit. In this way, very few convolutions of wire will be required in the series coils, to maintain constant potential in the work-circuit.

The work-circuit is, in accordance with a "three-wire" system, subdivided by a compensating conductor marked P, which gives off two branches marked Q, Q', leading to separate commutators, in the usual manner; but, of course, there is this distinction between similar systems heretofore in use and my present scheme; since I return the branch conductors Q and Q' to separate armature circuits mounted upon the said shaft, while other systems return similar conductors to separate armatures mounted upon separate shafts.

My scheme enables me to construct a three-wire system plant much cheaper than if two complete machines were to be used.

Having thus described my invention, and in accordance therewith, I claim as new—

1. The combination with a work-circuit having three main line conductors and translating devices arranged therein in multiple-series, of an electric-machine having two generating armature circuits mounted upon one shaft, each circuit terminating in a separate commutator, each commutator provided with two collecting brushes, a conductor connecting one brush of one commutator with one brush of the other commutator, and said conductor connected with one of the main line conductors of the work-circuit, two inductive fields-of-force for acting upon said two armature circuits, shunt field-magnet coils for primarily exciting the machine into generative action, and two sets of supplemental field-magnet coils, one of said sets being connected to one of said main line work-circuit-conductors, and the other set being connected to another of said main line work-circuit-conductors, substantially as described.

2. The combination with a work-circuit having three main line conductors and translating devices arranged therein in multiple-series, of an electric machine provided with two generating armature circuits mounted upon one shaft, each circuit terminating in a separate commutator, each commutator provided with two collecting brushes, a conductor connecting one brush of one commutator with one brush of the other commutator and said conductor connected with one of the main line conductors of the work-circuit; two inductive fields-of-force for acting upon said two armature circuits, two sets of shunt field-magnet coils, one of said sets being supplied with current from one of said armature circuits and the other set being supplied with current from the other armature circuit, and two sets of supplemental field-magnet coils, one of said sets being connected to one of said main line work-circuit conductors and the other set being connected to another of said main line work-circuit conductors, substantially as described.

3. The combination in an electric machine, of two generating armature circuits mounted upon one shaft, and field magnets provided with two sets of shunt coils L, M, one of said sets being supplied with current from one of said armature circuits and the other set being supplied with current from the other armature circuit, substantially as described.

4. The combination with a work-circuit having three main line conductors and translating devices arranged therein in multiple-series, of an electric-machine provided with two generating armature circuits mounted upon one shaft, each circuit terminating in a separate commutator, each commutator provided with two collecting brushes, a conductor connecting one brush of one commutator with one brush of the other commutator, and said conductor connected with one of said main line work-circuit conductors, and field-magnets provided with two sets of supplemental coils, one of said sets being connected to one of said main line work-circuit conductors, and the other set being connected to another of said main line work-circuit conductors, substantially as described.

5. In combination, a work-circuit and an electric machine provided with field magnets having four sets of coils J, K, L, M, an armature having two circuits each terminating in its respective commutator, one set of said field coils being connected in shunt with one of said armatures, another of said field coils being connected in shunt with the other armature, said work-circuit provided with three conductors N, O, P, one of the conductors of the work-circuit being in series with one of said sets of field coils, another conductor of the work-circuit being in series with another set of field coils, and one of the three conductors of the work circuit being connected with each armature circuit, substantially as described.

6. In an electric machine, field magnets provided with two sets of exciting coils L, M, an armature provided with two circuits terminating in their respective commutators said two sets of field coils being each independently supplied with currents, one of said sets supplied with current from one of said armature circuits, and the other of said sets supplied with current from the other of said armature circuits, substantially as described.

In testimony whereof I sign this specification in the presence of two witnesses.

THOMAS H. HICKS.

Witnesses:
N. S. WRIGHT,
O. B. BAENZIGER.